United States Patent [19]

Carre et al.

[11] Patent Number: 4,630,713
[45] Date of Patent: Dec. 23, 1986

[54] DISC BRAKE WITH SLIDING CALIPER

[75] Inventors: Jean-Jacques Carre, Le Raincy; Alain Thioux, Chennevieres; Jean-Claude Mery, Pavillons-sous-Bois, all of France

[73] Assignee: Societe Anonyme D.B.A., Paris, France

[21] Appl. No.: 724,144

[22] Filed: Apr. 17, 1985

[30] Foreign Application Priority Data

Apr. 26, 1984 [FR] France ................ 84 06585

[51] Int. Cl.⁴ .................... F16D 55/224; F16D 65/00
[52] U.S. Cl. ............................. 188/73.44; 188/73.39
[58] Field of Search ............ 188/18 A, 31, 69, 72.1, 188/72.2, 73.35, 73.41, 73.42, 73.43, 73.44, 73.45, 73.39; 267/57.1 A; 384/280, 281

[56] References Cited

U.S. PATENT DOCUMENTS

| | | | |
|---|---|---|---|
| 2,233,191 | 2/1941 | Arcier et al. | 267/57.1 A |
| 3,332,521 | 7/1967 | Burnett | 188/72.2 |
| 3,893,546 | 7/1975 | Kestermeier et al. | 188/73.44 X |
| 4,106,595 | 8/1978 | Kiruma et al. | 188/73.39 X |
| 4,311,219 | 1/1981 | Watanabe et al. | 188/71.8 |
| 4,424,880 | 1/1984 | Frigger et al. | 188/73.35 |
| 4,436,186 | 3/1984 | Ritsema et al. | 188/73.44 X |
| 4,533,025 | 8/1985 | Carré | 188/73.44 |

FOREIGN PATENT DOCUMENTS 0080950  6/1983  European Pat. Off.
2408766  7/1979  France ................ 188/73.43

Primary Examiner—Douglas C. Butler
Assistant Examiner—Robert J. Oberleitner
Attorney, Agent, or Firm—Larry J. Palguta; Ken C. Decker

[57] ABSTRACT

Disc brake of the type incorporating a caliper (10) sliding on a fixed support by way of at least one axial pin (14) lying parallel to the axis of the disc (16), a brake actuator (22) acting directly upon an inner friction component (28), and, by reaction through the caliper (10), upon an outer friction component (30), the friction components (28, 30) being tangentially offset each side of a radial plane (Pr) passing through the axis of the brake actuator (22), the inner friction component (28) being anchored on the fixed support, the outer friction component (30) being anchored on the caliper (10), the tangential offset of the friction components (28, 30) being such that during forward braking (B) the caliper is subjected to a tangential force (Ft) generated by the outer friction component (30). The caliper (10) incorporates a device for positioning (32) the caliper relative to the fixed support, the positioning device (32) being progressive and dependent upon the tangential force (Ft) over a predetermined range of the force (Ft).

2 Claims, 8 Drawing Figures

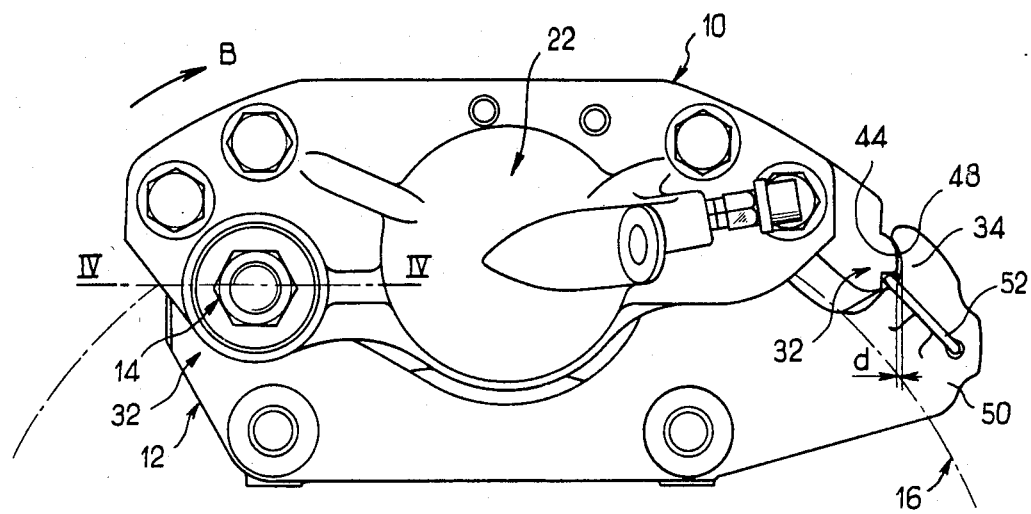
FIG_1
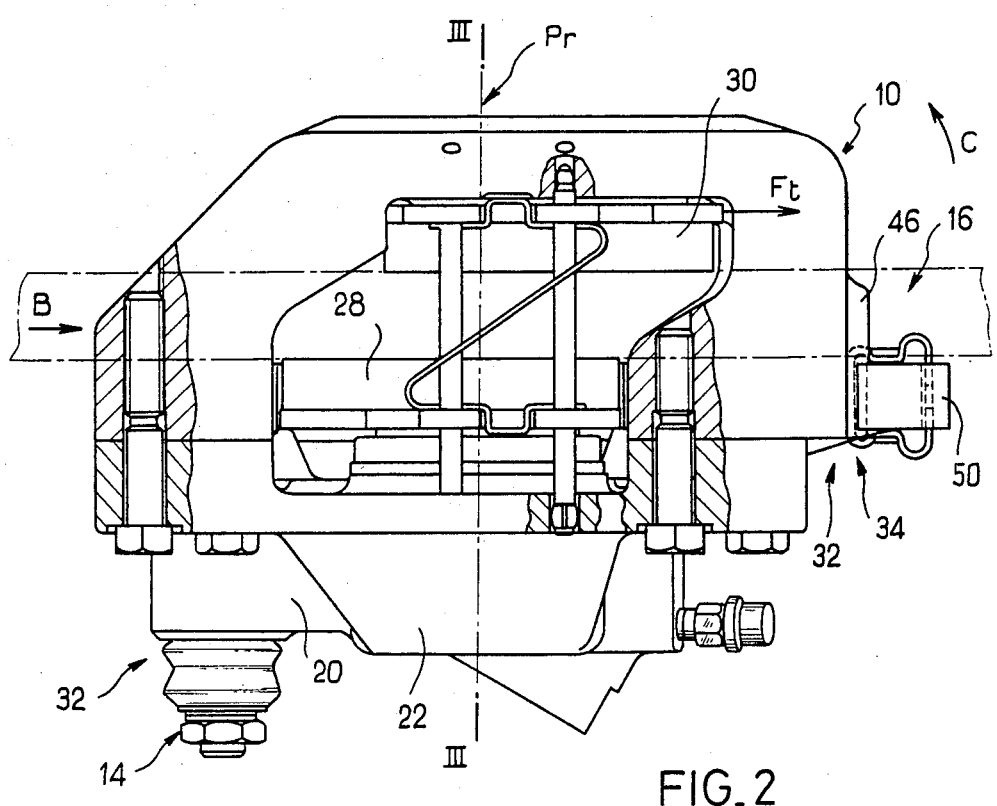
FIG_2

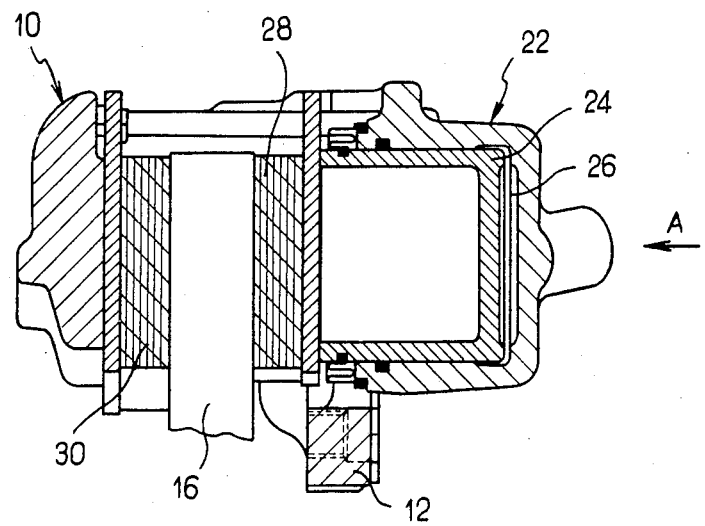
FIG_3
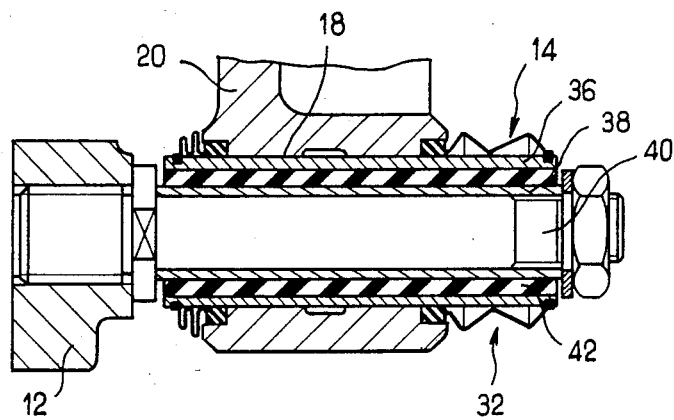
FIG_4

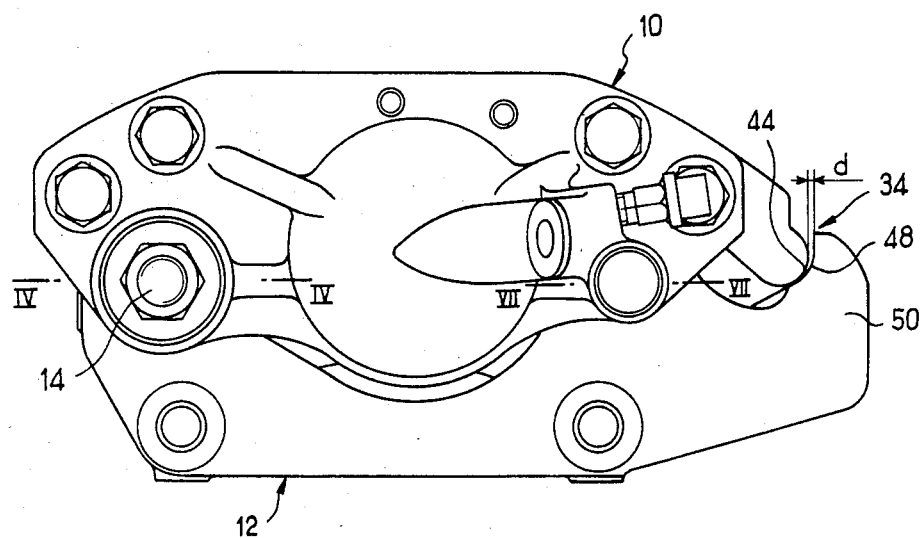
FIG_5
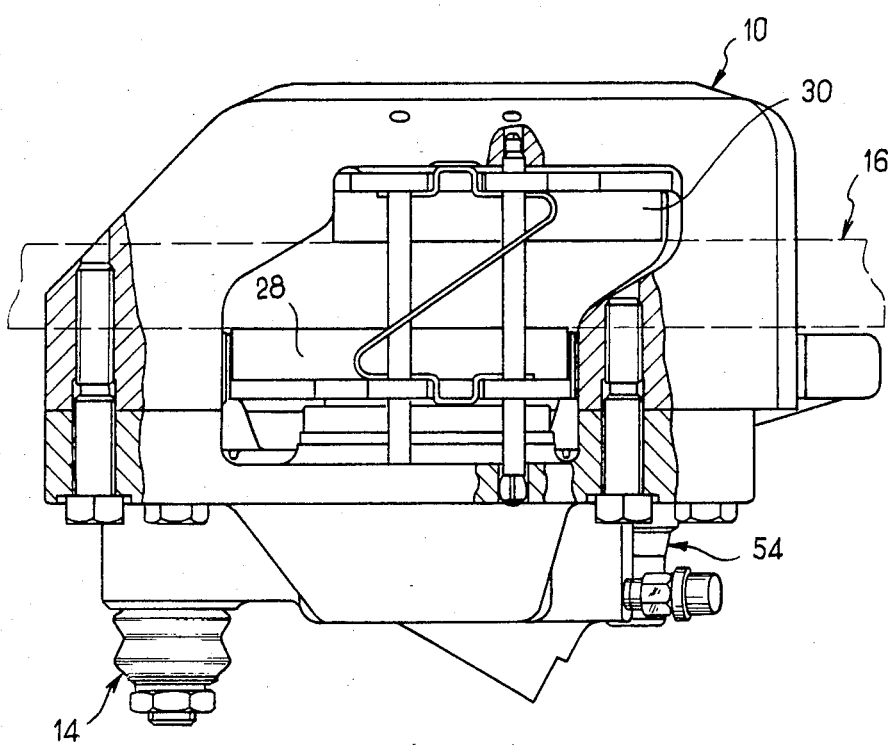
FIG_6

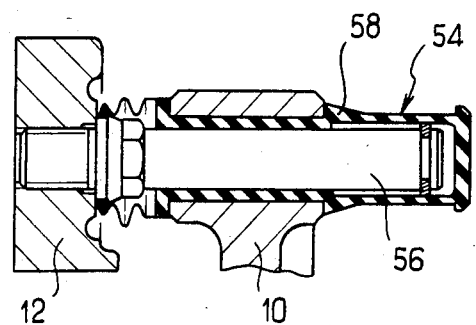
FIG_7
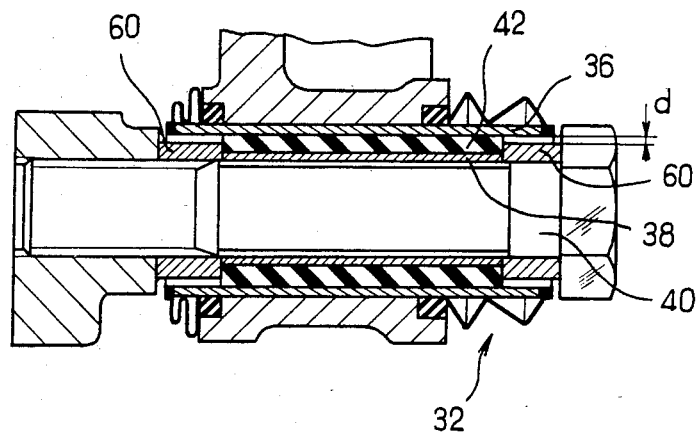
FIG_8

DISC BRAKE WITH SLIDING CALIPER

The subject of the present invention is a disc brake incorporating a caliper sliding on a fixed support by means of at least one axial pin.

U.S. Pat. No. 4,533,025 illustrates and describes a disc brake incorporating a caliper mounted so as to slide on a fixed support along a single axial pin. The brake incorporates two friction components which are tangentially offset on each side of a radial plane passing through the axis of the brake actuator thus allowing the differential wear on the inner and outer friction components to be corrected. During braking of forward motion of the vehicle, appropriate offsetting of the friction components enables the axial pin to carry only a tangential force corresponding to the drag generated by the outer friction component, the reaction to rotation of the caliper in the tangential plane when the latter is pushed by the outer friction component and supported by the brake disc. Although this construction is satisfactory in the majority of cases, it has nevertheless been shown that when braking from high speed with weak to medium intensity, geometrical defects of the disc are capable of generating a pulsating braking torque which can affect driving comfort. The geometrical defects of the disc are either those inherent in the manufacture of the latter, or in the ventilated type of disc the geometrical defects may appear owing to the different expansion rates across the cooling channels. These pulsations of torque, and more particularly those generated by the outer friction component, are then transmitted through the intermediary of the caliper to the pillar and thus to the fixed support, which generates vibration in the region of the front axle of the vehicle which is transmitted to the steering wheel, if the brake in question is mounted on the front axle of the vehicle.

The object of the invention is to propose a disc brake having all the advantages of offset pads and in which, for a predetermined range of braking torque, the torque pulsations are not transmitted to the fixed support. With this object, the invention proposes a disc brake of the type incorporating a caliper sliding on a fixed support by means of at least one axial pin lying parallel to the axis of the disc, a brake actuator acting directly upon an inner friction component, and, by reaction through the caliper, upon an outer friction component, the friction components being tangentially offset on each side of a radial plane passing through the axis of the brake actuator, the inner friction component being anchored on the fixed support, the outer component being anchored on the caliper, the tangential offset of the friction components being such that during forward braking the caliper is subjected to a tangential force generated by the outer friction component, characterized in that the caliper incorporates a device for positioning the caliper relative to the fixed support, the positioning device being progressive and dependent on the tangential force over a predetermined range of the force.

It is evident that, owing to such a construction the positioning device disconnects the caliper from the fixed support over the range of torque for which the pulsations appear, the positioning device being dependent on the tangential force generated by the inner friction component, which allows progressive movement of the caliper relative to the fixed support.

According to another characteristic of the invention, the positioning device incorporates abutment means limiting the movement of the caliper relative to the fixed support beyond the predetermined range, thus allowing true anchoring of the caliper to the fixed support for those values of torque for which the pulsations no longer appear.

According to another characteristic of the invention, the positioning device incorporates a damping device limiting the pulsations of torque.

Other characteristics and advantages of the disc brake which is the subject of the present invention will emerge from the following detailed description which refers to the accompanying drawings in which:

FIG. 1 is a front view of a disc brake constructed in accordance with the instructions of the present invention;

FIG. 2 is a plan view of the disc brake shown in FIG. 1 with portions shown in section;

FIG. 3 is a view sectioned on the line III—III shown in FIG. 2;

FIG. 4 is a partial enlarged view sectioned on the line IV—IV shown in FIG. 1;

FIG. 5 is a view similar to that shown in FIG. 1 for a second embodiment of the invention;

FIG. 6 is a plan view of the brake shown in FIG. 5;

FIG. 7 is a partial enlarged view sectioned on the line VII—VII shown in FIG. 5; and FIG. 8 is a partial enlarged view sectioned on the line IV—IV of a variant of the brake shown in FIG. 5.

The disc brake shown in FIGS. 1 to 4 incorporates a movable caliper 10 mounted so as to slide on a fixed support 12. The caliper 10 is mounted so as to slide on the fixed support 12 by means of an axial pin 14 lying parallel to the axis of rotation of a rotating disc 16. As FIG. 4 shows in greater detail, the axial pin 14 is fixed to the fixed support 12 by a threaded connection. The axial pin 14 is housed so as to slide in a cylindrical bore 18 formed in an arm 20 of the caliper 10. Protective covers are provided between the arm 20 and the ends of the pin 14 to protect the sliding surfaces. In a conventional manner, as shown in FIG. 3, the caliper 10 incorporates a brake actuator designated as an assembly by the reference 22, this brake actuator incorporating a piston 24 capable of being pushed in the direction of the arrow A when fluid under pressure is introduced into a chamber 26 of the brake actuator from a source of pressure (not shown). The piston 24 is capable of acting directly upon an inner friction component 28, and, by reaction through the sliding caliper, upon an outer friction component 30 so as to cause frictional engagement of the components 28 and 30 against the opposite surfaces of the disc 16. If the radial plane passing through the center of the brake actuator 22 is given the reference Pr and the direction of rotation of the disc 16 when the vehicle is moving forward is shown by the arrow B, it is seen that the center of the outer friction component 30 is offset to the right relative to the radial plane and that the center of the inner friction component 28 is offset to the left of the plane Pr as shown in FIG. 2. It is evident that the frictional engagement of the two friction components 28 and 30 with the rotating disc creates a torque in the direction of the arrow C shown in FIG. 2 thus correcting the differential wear for each of the friction components, and, for an appropriately chosen offset, enables the pin 14 to support only the tangential force Ft generated by the outer friction component 30. This phenomenon of correction is broadly explained in the aforementioned U.S. Patent and will not be developed further at the present time.

In accordance with the invention, the brake shown in FIGS. 1 to 4 incorporates a positioning device designated as an assembly by the reference 32. In this embodiment, the positioning device 32 is formed firstly by the pin 14, and secondly by the abutment means 34 as will be seen in the description which follows. Referring to FIG. 4, it is seen that the pin 14 is formed of an outer tube 36 on which the caliper 10 is capable of sliding by means of the bore 18 formed in the arm 20, of a second inner tube 38 fixed to the fixed support 12 by means of a threaded system designated as an assembly by the reference 40, and lastly an elastic sleeve 42 mounted between the two tubes 36 and 38 and firmly fixed to the latter. As will be seen later the elastic sleeve 42 forms the component which is progressively deformable and also forms a damping device. Referring to FIGS. 1 and 2, it is seen that the positioning device 32 incorporates abutment means 34 formed by a convex surface 44 formed on a bar 46 of the caliper 10 and co-operating with a concave surface 48 formed on an arm 50 of the fixed support 12. As shown in greater detail in FIG. 1, the two convex and concave surfaces are separated circumferentially by a distance d. It will be noted that the radius of curvature of the convex surface 44 is smaller than the radius of curvature of the concave surface 48. A spring 52 firmly fixed to the arm 50 of the fixed support 12 pushes the bar 46, and thus the caliper 10, radially outwards and holds the convex surface 44 and the concave surface 48 elastically in contact. It will be noted that the distance d between the surfaces 44 and 48 at rest is considerably less than the thickness of the elastic sleeve 42.

The brake which is described above with the aid of FIGS. 1 to 4 operates in the following manner:

At rest, the different components occupy the positions shown in the Figures. When fluid under pressure is admitted into the chamber 26 of the brake actuator 22, the piston 24 is pushed in the direction of the arrow A shown in FIG. 3 and applies the inner friction component 28 against a first surface of the disc 16. By reaction, the caliper 10 slides on the pin 14, and more exactly, the bore 18 of the arm 20 slides on the outer surface of the tube 36. The caliper 10 having moved in the opposite direction to that of the arrow A, the outer friction component 30 is applied against the other surface of the disc 16. The friction component 30 generates a tangential force Ft owing to the friction between this component 30 and the disc 16, and the force Ft is entirely transmitted to the arm 20 of the caliper 10 owing to the circumferential offset of the friction components 28 and 30. This force Ft applied to the arm 20 pushes the pin 14 in the same direction and, more exactly, pushes the elastic sleeve 42 through the outer tube 36. Under the effect of this force Ft, the sleeve 42 deforms progressively by compression of the rubber, as a function of the applied force Ft; during this phase of operation, the convex surface 44 progresses along the concave surface 48, and the distance d which separates these two surfaces in the circumferential direction decreases against the spring 52. When the force Ft is such that the sleeve 42 has deformed sufficiently for the distance d to become zero the caliper 10 is in true abutment against the fixed support 12. For any increase in the force Ft, the caliper remains in abutment against the fixed support 12 and the movement of the caliper is limited to the predetermined movement d.

Clearly, the choice of hardness of the sleeve 42 and the choice of the clearance d in the region of the abutment means 34 enable the range to be accurately defined of the tangential force Ft for which the caliper 10 is elastically suspended relative to the fixed support 12 and does not transmit to the latter the pulsations of Ft, the elastic sleeve 42 also forming a device for damping these pulsations. However, beyond the range over which these pulsations can appear the caliper is positively anchored on the fixed support so as to support the tangential forces of higher value. Thus the brake incorporates a device for positioning the caliper relative to the fixed support which is dependent upon the tangential force Ft and which allows progressive movement of the caliper 10 over a predetermined range of the force Ft, a range beyond which the caliper 10 comes into true abutment against the fixed support 12.

FIGS. 5, 6 and 7 show a second embodiment of the invention, in which the same components carry the same references. In this embodiment, a second sliding pin 54 is positioned between the fixed support 12 and the caliper 10. This pin is formed by a shaft 56 which is firmly fixed to the fixed support 12 and which slides in an elastic sleeve 58, firmly fixed to the caliper 10, the sliding taking place between the shaft 56 and the sleeve made of rubber 58. The elastic sleeve 58 ensures elastic contact between the convex surface 44 and the concave surface 48 formed on the caliper 10 and on the fixed support 12, respectively, as in the first embodiment, but differing in that, in this embodiment, the elastic sleeve 58 providing the function of the elastic component 52 of the first embodiment pushes the caliper 10 radially inwards relative to the fixed support 12.

The operation of this second embodiment is identical to that of the first embodiment and will not be described further.

FIG. 8 shows a variant of the second embodiment in which the abutment means 34 are provided by the pillar 14. In this variant, the fixed support does not incorporate the arm 50 and the caliper 10 is not provided with the bar 46 or with the convex surface 44. The abutment function 34 is achieved by means of two rigid rings 60 positioned at the two ends of the elastic sleeve 42 in such a way as to define between these rings 60 and the outer tube 36 a radial clearance d which is identical or similar to the circumferential clearance which exists between the two convex and concave surfaces of the two previous embodiments. These rigid rings may either be interposed between the inner tube 38 and the outer tube 36 leaving the clearance d or may be positioned directly on the screw 40 limiting the deformation of the sleeve 42 by the outer tube 36 coming into abutment against the rigid rings 60.

The operation is thus identical to that of the two previous embodiments, when the tangential force Ft reaches the predetermined value, the positioning device 32 prevents any further movement of the caliper relative to the fixed support beyond the predetermined maximum movement d.

As in the two previous embodiments, the stiffness of the rubber of the sleeve 42 and the distance d between the rings 60 and the outer tube 36 define the range over which the positioning device is dependent on the tangential force of the outer friction component 30.

It is evident that the invention is not limited to the embodiments which are described above, in particular the abutment surfaces can be rectilinear and not convex and concave, and in the same way the arrangement of the pillar 14 can be modified without departing from the scope of the present invention.

We claim:

1. A disc brake of the type incorporating a caliper sliding on a fixed support by means of at least one axial pin lying parallel to the rotational axis of a disc, a brake actuator acting directly upon an inner friction component and, by reaction through the caliper, upon an outer friction component, the friction components being tangentially offset on each side of a radial plane passing through the translational axis of the brake actuator, the inner friction component being anchored on the fixed support, the outer friction component being anchored on the caliper, the tangential offset of the friction components being such that during forward braking the caliper is subjected to a tangential force generated by the outer friction component, characterized in that the caliper includes a positioning device for positioning the caliper relative to the fixed support, the positioning device being progressive and dependent upon the tangential force over a predetermined range of the tangential force, the positioning device including the axial pin which has a progressively deformable componet which is progressively deformable under the effect of the tangential force that effects a circumferential movement of the caliper relative to the fixed support, the positioning device also including abutment means for limiting the circumferential movement to the predetermined range, the abutment means fixed firmly to the pin and limiting deformation of the progressively deformable component, the pin comprising an elastic sleeve positioned without play between concentric inner and outer tubes, the inner tube being fixed to the fixed support and the outer tube passing through a bore formed in the caliper, the caliper capable of sliding relative to the outer tube, and two rigid rings positioned with a radial clearance at ends of the tubes and between the tubes in order to limit the deformation of the elastic sleeve to a radial distance corresponding to a predetermined maximum movement of the caliper.

2. A disc brake of the type incorporating a caliper sliding on a fixed support by means of at least one axial pin lying parallel to the rotational axis of a disc, a brake actuator acting directly upon an inner friction component and, by reaction through the caliper, upon an outer friction component, the friction components being tangentially offset on each side of a radial plane passing through the translational axis of the brake actuator, the inner friction component being anchored on the fixed support, the outer friction component being anchored on the caliper, the tangential offset of the friction components being such that during forward braking the caliper is subjected to a tangential force generated by the outer friction component, characterized in that the caliper includes a positioning device for positioning the caliper relative to the fixed support, the positioning device being progressive and dependent upon the tangential force over a predetermined range of the tangential force, the positioning device including the axial pin which has a progressively deformable component which is progressively deformable under the effect of the tangential force that effects a circumferential movement of the caliper relative to the fixed support, the positioning device also including abutment means for limiting the circumferential movement to the predetermined range, the abutment means fixed firmly to the pin and limiting deformation of the progressively deformable component, the pin comprising an elastic sleeve positioned without play between concentric inner and outer tubes, the inner tube being fixed to the fixed support and the outer tube passing through a bore formed in the caliper, the caliper capable of sliding relative to the outer tube, and two rigid rings fixed firmly to the inner tube and positioned at ends of the inner tube to have a radial distance between outer surfaces of the rings and an inner surface of the outer tube, the radial distance corresponding to a predetermined maximum movement of the caliper.

* * * * *